Figure 1:
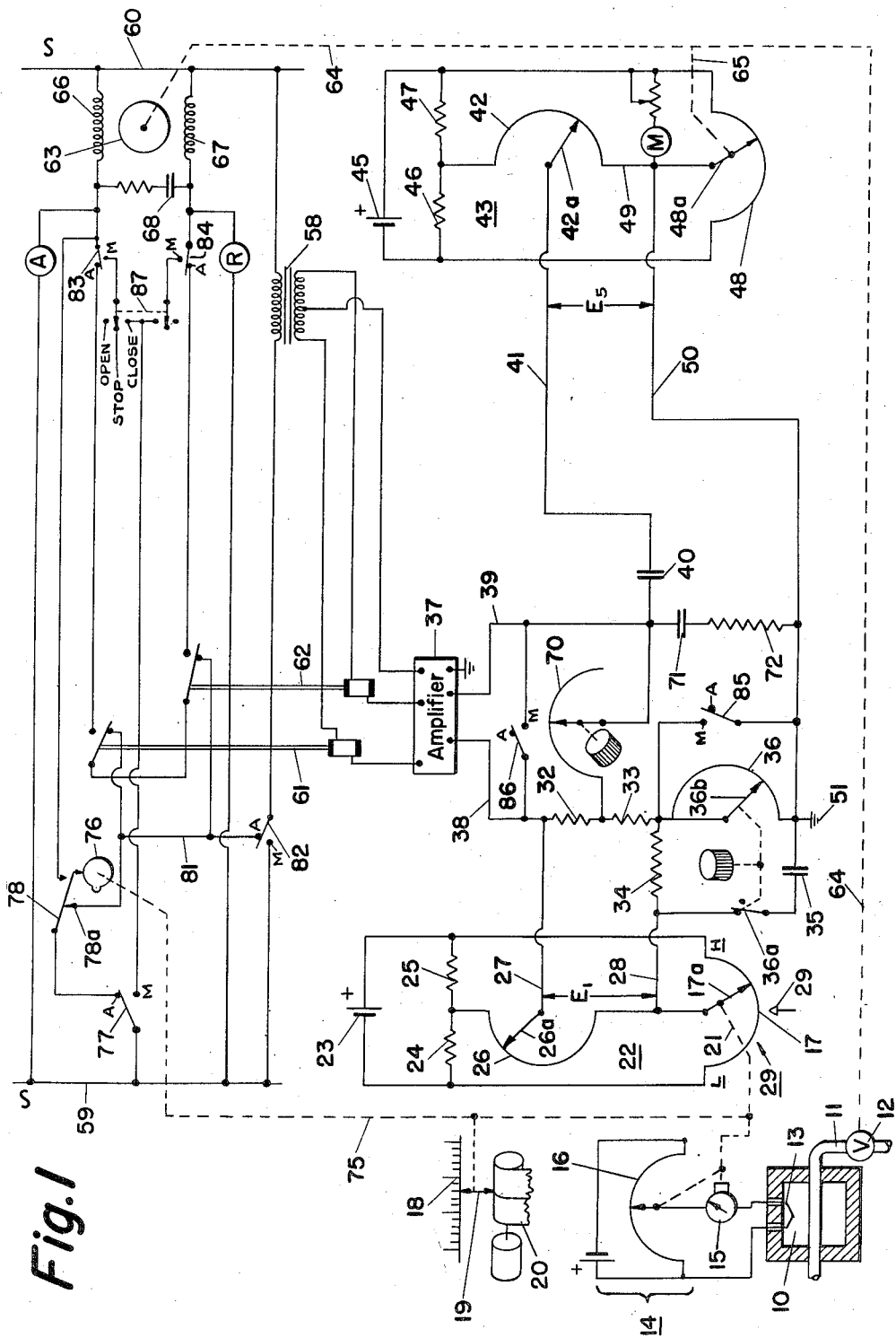

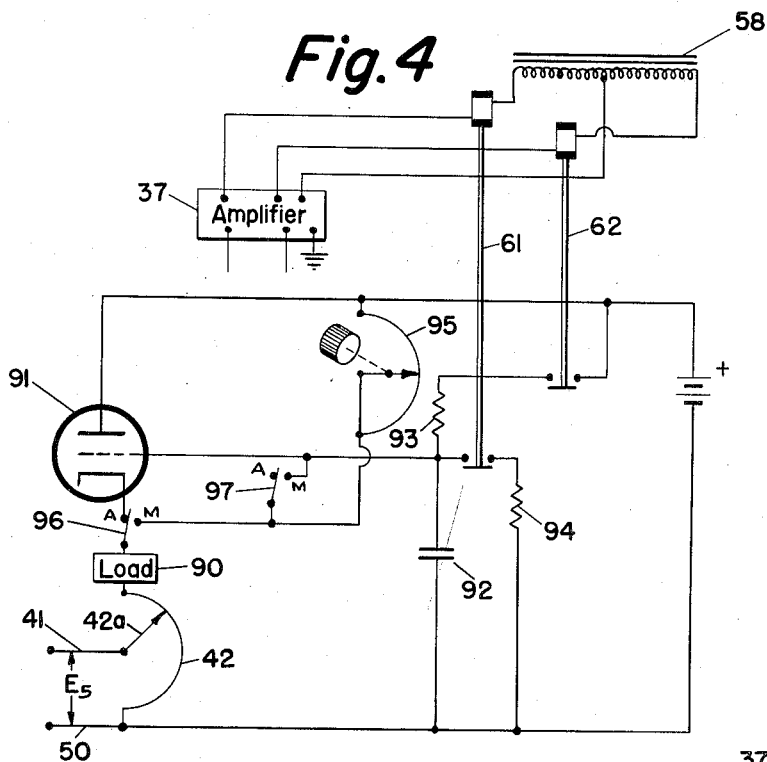
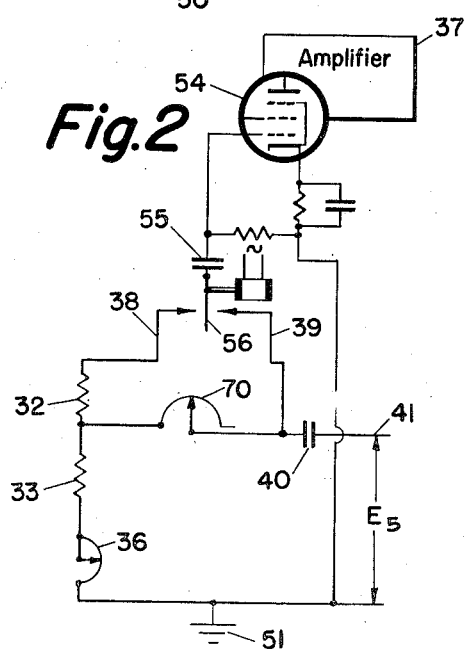
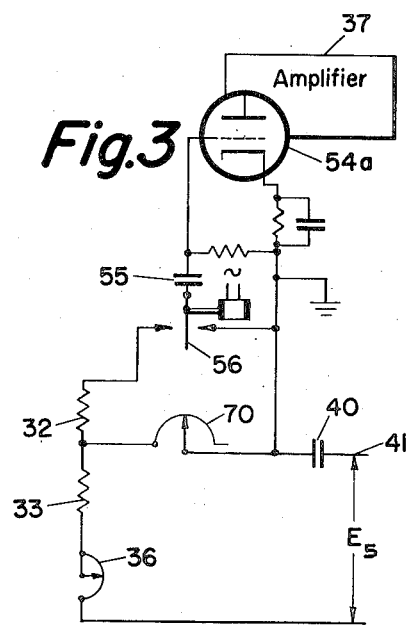

United States Patent Office 2,830,245
Patented Apr. 8, 1958

2,830,245

RATE AND RESET REBALANCEABLE CONTROL SYSTEM

Elwood T. Davis, Havertown, Pa., and Henry A. Kalina, North Judson, Ind., assignors to Leeds and Northrup Company, Philadelphia, Pa., a corporation of Pennsylvania Application September 2, 1955, Serial No. 532,294

4 Claims. (Cl. 318—28)

This invention relates to automatic control systems of the type disclosed in Davis Patent No. 2,666,170 and has for an object the provision of an improved and simplified system which, by reason of the cooperation of the elements thereof, prevents excess reset action beyond the limits of the proportional band and at the same time provides an independence of the several control actions. It also provides for an improved rate-of-approach action.

The present invention is an improvement over application Serial No. 532,161, filed September 2, 1955, by Elwood T. Davis, one of the present applicants.

In carrying out the present invention in one form thereof, there is provided a system for developing an output signal in accordance with the magnitude of a condition, which may be pressure, temperature, the pH of solutions, and the like. The output signal has a component determined by the rate of the change of the magnitude of said condition, a component determined by the time integral of the deviation of said magnitude from the predetermined level, and a proportional component dependent upon the extent of change of magnitude of said condition.

More particularly, there is provided a means for producing the proportional component as by a network which develops a change in voltage output in accordance with the change in magnitude of said condition. By a second means which may include a resistance-capacitance circuit, there is produced a second signal or component which varies in accordance with rate of change of said magnitude of said condition. A signal or voltage-amplifying means is provided. In its input circuit these two components in the form of voltages are connected effectively in series with each other, the output from the amplifying means being determined in part by the relative magnitudes of the two input voltages and in part by a feedback voltage varying with the change in output of the amplifying means. An electrical storage device, such as a capacitor, is connected effectively in series with the input circuit of the amplifying means, and a reset resistor is connected across the input circuit in such a manner as to include in its connection a fractional part of the voltage representing the deviation in magnitude of the condition from a predetermined level. By reason of the latter connections in association with the capacitor and the feedback voltage which operates to maintain the input voltage to the amplifier at substantially zero, there is developed a component varying in accordance with the time integral of the deviation. The claims of the present application are particularly directed to the manner in which the reset resistor is connected in the circuit, which connection prevents excess reset action.

For further objects and advantages of the invention and for a more detailed description thereof, reference is to be had to the following description taken in conjunction with the accompanying drawings, in which:

Fig. 1 diagrammatically illustrates a system embodying one form of the invention;

Fig. 2 diagrammatically illustrates more in detail the input circuit of the amplifier of Fig. 1;

Fig. 3 diagrammatically illustrates a modified form of the input circuit of the amplifier of Fig. 1; and Fig. 4 diagrammatically illustrates a modification which may be substituted for a part of the system of Fig. 1.

Referring to Fig. 1, the invention in one form has been shown as applied to the control of the magnitude of a condition which is illustrated as the temperature of a furnace or heat-treating device represented by a compartment or chamber 10 through which there extends a heat-transferring coil 11, the heating medium thereof being under the control of the final control element of a system and which is shown as a valve 12. A thermocouple 13 subject to the temperature within the chamber 10 applies a voltage to a measuring circuit 14. A circuit-adjusting means 15 serves not only to balance said voltage by adjustment of a slidewire resistor 16 in the potentiometer forming a part of the measuring circuit 14, but also serves relatively to adjust a slidewire 17 and its movable contact 17a in network 22. The circuit-adjusting means 15 is responsive to the difference between the thermocouple voltage and the potential difference applied in opposition thereto and as derived from the slidewire 16. The adjusting means or device 15 is preferably of the electronic type. It may be of the type shown in Williams Patent No. 2,113,164, or it may be of the mechanical type, as illustrated in Squibb Patent No. 1,935,732.

The device 15 may have associated with it a scale 18 and an index 19 for indicating the magnitude of the temperature of compartment 10, and by means of a chart 20 a continuous record of the temperature may be recorded.

Through a mechanical connection as indicated by the broken line 21, the contact 17a is adjusted relative to slidewire or resistor 17 in accordance with the magnitude of the temperature of the compartment 10. The slidewire 17 is included in the network 22 having a source of voltage 23 and equal-valued resistors 24 and 25. A circuit extending from their mid-point includes a slidewire or resistor 26 and the contact 17a of slidewire 17. When the contact 17a is mid-way of the ends of the slidewire 17, the temperature of compartment 10 will be at the control point, and the voltage $E_1$ between conductors 27 and 28 will be zero. The position of slidewire contact 17a will then be opposite the index 29. The control point may be varied by bodily moving the slidewire 17 about the axis of rotation of contact 17a, the slidewire 17 thereafter being held stationary.

As shown, the contact 17a has been displaced to the right, indicating that the temperature of compartment 10 is not at the control point. It will be assumed that the temperature is above the selected value. Accordingly, the voltage $E_1$ will have a magnitude proportional to the extent of deviation of the temperature from the control point and of a polarity dependent upon the above-assumed direction of the temperature from the control point. The voltage $E_1$ is applied by conductors 27 and 28 to a circuit which includes resistors 32, 33 and 34. Resistor 34 forms with resistors 32 and 33 a voltage-dividing network. For example, with resistor 34 having a resistance of 10,000 ohms and the resistors 32 and 33 having a total resistance of 1,000 ohms, the voltage developed across resistors 32 and 33 will be one-eleventh of the voltage $E_1$. The resistor 34 has connected across it a rate capacitor 35 which develops across adjustable resistor 36 a voltage proportional to the rate of change of temperature of compartment 10. Adjustable resistor 36 is connected in series-circuit relation with resistors 32 and 33. As the temperature of compartment 10 changes, the voltage $E_1$ will correspondingly change. The magnitude of the current flow through capacitor 35 depends upon the rate of change of voltage $E_1$ and the potential difference developed across that part of resistor 36 connected in the input circuit in series with resistors 32 and 33 will have a magnitude proportional to that rate of change.

The resistors 32, 33 and 36, in series with each other, are also effectively in series in the input to an amplifier 37, the conductors 38 and 39 forming a part of its input circuit. The conductor 39 is connected to one side of a reset capacitor 40 which is included in a circuit extending by way of conductor 41 to the movable contact 42a of a slidewire 42 included in a network 43 having a source of voltage 45, resistors 46 and 47, and a valve slidewire 48. The slidewire 42 is in a circuit extending from the juncture of resistors 46 and 47 to the movable contact 48a of the slidewire 48. The part of the input circuit traced to contact 42a extends by way of conductors 49 and 50 to the ground connection 51.

Before explaining how the capacitor 40 introduces the reset action, the manner in which the several voltage components are effectively in series in the input of the amplifier 37 will be presented.

Referring to Fig. 2, the input stage of the amplifier 37 is shown as including a pentode 54 which may be a vacuum tube of the 5879 type, although it is to be understood that other types of tubes may be used, one adapted for a high-impedance input circuit being preferred. The control grid of tube 54 is connected by way of a coupling capacitor 55 to the movable contact 56 of a vibrator driven by an operating coil at any suitable frequency between two stationary contacts associated with it. When the movable contact 56 is in its left-hand position, it will be observed the input circuit extends by way of conductor 38 through resistors 32, 33 and 36 to ground. When the movable contact 56 is in its right-hand position, the input circuit to the amplifier 37 extends by way of conductor 39, capacitor 40, conductor 41, slidewire contact 42a, Fig. 1, and by way of conductors 49 and 50 to ground. Inasmuch as the vibrator is ordinarily driven at a line frequency of 60 cycles per second, capacitor 55 develops a potential in the input circuit representative of the algebraic sum of the voltages developed across resistors 32, 33, 36, capacitor 40, and a part of slidewire 42. Accordingly, the voltages or potential differences are effectively in series with each other in the input to the amplifier 37.

In Fig. 3 the right-hand stationary contact of the vibrator is connected directly to ground, and when the movable contact 56 is in its left-hand position, the algebraic sum of the potential differences in series in the input circuit is applied to the amplifier 37.

While in Fig. 2 the summation of the voltages takes place by reason of the action of the vibrator which effectively places them in series with each other, in Fig. 3 the summation of the voltages takes place in the input circuit associated with the left-hand stationary contact. When the contact 56 engages the right-hand stationary contact, the capacitor 55 is connected to ground. The operation converts the difference-voltage alternately applied to the capacitor 55 into alternating current at the input of the triode 54a.

The output circuit of the amplifier, Fig. 1, includes a center-tapped secondary winding of a transformer 58 supplied from alternating-current supply lines 59 and 60. Under the control of the input circuit, the output of the amplifier selectively energizes the operating coils of contactors 61 and 62 as the polarity of the voltage applied to the input circuit changes. With operation of the contactors 61 and 62, the amber and red signal lights "A" and "R" are selectively deenergized. With the assumed temperature of compartment 10 above the control point, the amplifier energizes contactor 61 which closes to complete an energizing circuit for a motor 63 which through mechanical connections 64 and 65 adjusts contact 48a of valve slidewire 48. The action of the motor in adjustment of contact 48a produces a potential difference $E_5$ of magnitude which reduces to zero the voltage difference applied to the input of amplifier 37. Accordingly, the adjustment of contact 48a is in accordance with the output of the amplifier 37, notwithstanding its adjustment is through the operation of motor 63. The motor itself includes windings 66 and 67 and a phase-shifting capacitor 68.

Upon closure of contactor 61 the amber signal light A is deenergized by completion of a shorting circuit which may be traced from one side of lamp A, contact 83, the contacts of contactor 61 closed in its energized position, the contacts of contactor 62 closed in its deenergized position, contacts 78a and 77, and from supply line 59 to the other side of the signal lamp or light A. A similar shorting-circuit controlled by the upper contact of contactor 62 controls the deenergization of the signal lamp or light R.

Considering now the effect of the voltage $E_5$, it will be seen that it is applied to a circuit including the capacitor 40, a resistor 70 and resistors 33 and 36. The capacitor 40 introduces the reset component, one which varies with the time integral of the deviation of the temperature from its predetermined level or control point. With the temperature away from the control point, a fraction of the voltage $E_1$ is developed across resistor 32. The latter potential difference is not included in the circuit of capacitor 40 which was just traced. Remembering that the motor 63 functions to maintain the potential difference $E_5$ at a value which reduces to zero (to a close approximation) the input voltage to the amplifier, it will be seen that in order for the foregoing to be accomplished, $E_5$ must be changing at a rate for a flow of current through capacitor 40 which develops across resistor 70 a potential difference equal and opposite to that developed across resistor 32. The foregoing assumes that slidewire contact 17a is at standstill. With contact 17a remaining at standstill, the motor 63 will continue to function to change the voltage $E_5$ to maintain said flow of current through capacitor 40. Thus, capacitor 40 accumulates a charge which is representative of the time integral of deviation of the temperature of compartment 10 from the control point.

Ordinarily, any change in the position of valve 12 will cause the temperature of compartment 10 to change, and this will be reflected by a change in the position of contact 17a. The rate of movement of contact 17a will introduce the rate action into the input circuit of the amplifier as by the capacitor 35 and the rate resistor 36. When the polarity of the potential drop across rate resistor 36 is in the direction to oppose the current flow through reset resistor 70 (the temperature is departing from the control point), the contact 48a of valve slidewire 48 will need to be moved further than it would be moved in the absence of rate action in order for $E_5$ to establish balance at the input of the amplifier. Conversely, if the polarity of the voltage introduced by the rate resistor increases current flow through resistor 70, the position of slidewire contact 48a will differ in order to decrease the potential difference $E_5$. Thus, the rate resistor 36 has a direct effect upon the position of contact 48a and the position of the final control element, shown as the valve 12.

For convenience, reference will now be made to Fig. 3 for a discussion of the independence of control as between the proportional action, the rate action, and the reset action. Inasmuch as the potential difference across resistor 70 opposes that across resistor 32 in the input circuit to the amplifier, it will be seen that balance of the two voltages occurs when the current flowing through resistor 70 is related to the potential difference across the resistor 32. The current through resistor 70 comes through the reset capacitor 40. In order for the potential difference across resistor 70 to be equal and opposite to that across resistor 32, the charge which is accumulating on capacitor 40 must be changing at a rate related to the proportional action. This is accomplished by a corresponding change in the magnitude of voltage $E_5$. Voltage $E_5$ is changed to meet the foregoing requirements by the action of the motor 60 which at the same time adjusts the valve 12. Thus, the reset action is primarily related to the magnitude of the proportional action. Accordingly, the reset action has been made wholly independent of the rate action and is only dependent upon the proportional action.

The foregoing will be made even more apparent by considering the rate resistor 36. The potential difference or voltage $E_5$ includes a component equal to and opposite to that developed across rate resistor 36. Accordingly, the potential difference across the rate resistor 36 cancels out, insofar as its effect upon reset capacitor 40 is concerned. The same may be said of that component of the proportional action represented by the potential difference across resistor 33.

Further in connection with Fig. 3, the advantages of the present invention will be realized if the resistor 33 is eliminated or has zero value. Moreover, the rate action is readily adjustable by changing the position of the adjustable contact 36b as by the illustrated knob of Fig. 1. When the rate resistor 36 is entirely excluded from the input circuit of the amplifier, the switch 36a, Fig. 1, is opened to disconnect capacitor 35 from resistor 34. This assures that the rate action has been completely eliminated.

Referring again to Fig. 1, the width of the proportional band may be varied by the adjustment of slidewire contacts 26a and 42a. Preferably, these two contacts are ganged together for movement in opposite directions, electrically speaking, to increase $E_1$ and to decrease $E_5$, and vice versa.

The reset rate, frequently referred to by those skilled in the art in terms of the "repeats per minute" is varied by changing the value of the resistor 70, a knob being illustrated for that purpose. By increasing the value of resistor 70 (a lesser rate of change of $E_5$), a correspondingly smaller current flowing through resistor 70 by way of capacitor 40 will be required to produce the same potential difference opposing that existing across resistor 32. This smaller current changes capacitor 40 at a correspondingly slower rate and hence a slower rate of change of $E_5$ is required to maintain the above balanced conditions. If the temperature remains at its elevated value, the reset action alone, through the operation of motor 63 and the mechanical connection 64, will ultimately move the valve 12 to its fully closed position, i. e., to a position for minimum flow of the heating medium through the coil 11.

With valve 12 in its fully closed position, the contact 48a of slidewire 48 will remain in a fixed position at a corresponding limit of its travel, and the potential difference $E_5$ will no longer be changing. The charge on, or potential difference across, capacitor 40 will then attain a fixed value. If the resistor 70 were connected to the juncture of resistors 33 and 36, the charge on capacitor 40 would attain a voltage equal to voltage $E_5$. As shown, voltage $E_5$ is reduced by the voltage appearing across resistor 33 which is a fractional part of the voltage $E_1$. By thus reducing or limiting the voltage which can be acquired by the reset capacitor 40, the system will be returned to operation within the proportional band prior to attainment of the control point. This can be understood quite readily by assuming numerical values which are to be taken only as explanatory of the operation involved.

If because the deviation in temperature illustrated by the position of contact 17a in Fig. 1 produces a voltage $E_1$ with a magnitude of 11 volts, then by reason of the potential divider 34, 32—33, one volt will appear across resistors 32 and 33. Across resistor 32 there will be developed 0.82 volt, and across resistor 33 only 0.18 volt for assumed values for resistors 32, 33 and 34 of 820 ohms, 180 ohms and 10,000 ohms respectively. The charging voltage for the capacitor 40 will be $E_5$ minus 0.18 volt. As the temperature of compartment 10 returns toward the control point, the voltage $E_1$ will gradually decrease in value by reason of contact 17a moving toward index 29. Reversal in the polarity of the voltage applied to the amplifier by way of conductors 38 and 39 will occur as soon as the change in potential across resistor 33 slightly exceeds the voltage developed across resistor 32. By reason of the change in potential across resistor 33, current will flow through resistor 70 by way of capacitor 40, and when the potential drop across resistor 70, in polarity opposite to that across resistor 32, becomes of sufficient magnitude, it will cause a reversal of the input signal. More particularly, when the potential of 0.18 volt has been reduced to 0.03 volt, the change in potential will be 0.15 volt which is then greater than the voltage 0.136 across resistor 32. This assumes that the temperature of the compartment is rising at a sufficiently rapid rate that the charge on capacitor 40 remains substantially constant. In this manner the reversal in signal occurs before $E_1$ has been reduced to zero and before contact 17a arrives at the control point.

The foregoing description has been presented without reference to the effect of the rate action introduced by resistor 36 whose maximum value is of the order of 2 megohms with an associated rate capacitor 35 having a value in the order of 24 microfarads. As the temperature is reduced toward the control point, the potential difference developed across rate resistor 36 in the input circuit of the amplifier will be in the same direction (aiding) as the change in potential across resistor 33. Thus, the rate action will increase the potential difference across resistor 70 and produce reversal of the input signal to the amplifier at a still earlier point in time relative to the attainment of the control point.

During operation of the system within its proportional band, the potential difference across resistor 36, due to the rate action, occurs concurrently with change in temperature of compartment 10, inasmuch as contact 17a is adjusted by device 15 as the temperature changes, and it is not dependent upon the operation of the valve slidewire 48 as it would be if the rate action were derived from the network 43.

The capacitor 71 and the resistor 72 have not been described thus far since they do not affect the several control actions previously discussed. The capacitor 71 and resistor 72 provide a damping action for the motor 63 by developing a voltage in the input circuit of the amplifier related to the speed of operation of contact 48a and of motor 63. They function together in the same manner as described and claimed for the capacitor 59 and resistor 60 of said Davis Patent No. 2,666,170.

The time constant of the RC combination of capacitor 71 and resistor 72 is relatively small, as provided in accordance with the disclosure of said patent. Thus, the capacitor 71 may be as large as 24 microfarads in association with resistor 72 of 2700 ohms. This may be compared with the time constant of the reset circuit where the value of resistor 70 may be as high as 150 megohms in association with reset capacitor 40 of 10 microfarads.

With the above understanding of the operation of the invention resulting from an increase in temperature of compartment 10 above the control point, it is understood that the operation will be similar when the temperature decreases below the control point. The polarity of the voltage $E_1$ will be opposite to that developed for the increase in temperature above the control point, and the relative polarities of the associated networks will likewise be of opposite polarity. The motor 63 will be under the control of the contactor 62 to operate the valve 12 and the contact 48a in a valve opening direction. The reset component and the rate component will be present and will respectively have values related to the time integral of departure of the temperature from the control point and to the rate of change of the temperature.

In the event that the temperature of the compartment 10 should continue to rise and because of failure in the control system, the valve 12 is not operated to its closed position, a mechanical connection 75 from the device 15 through a cam 76 closes an energizing circuit for the motor 63 through winding 66 for operation of the motor in a direction to close the valve 12. This circuit may be traced from supply line 59 by single-pole, double-throw switch 77, the switch 78, and by way of the field winding 66 to the other supply line 60. The switch 78 in closing the foregoing circuit at the same time opens a circuit which may be traced through switch contact 78a, conductor 81, single-pole, double-throw switch 82 of the primary winding of the transformer 58 which is connected directly to the other supply line 60. If desired, the switch 78 may be provided with additional contacts for opening the circuits from the sources of supply 23 and 45 completely to deenergize the system in the event of attainment of an abnormal value of a condition under control.

The present system lends itself to manual control as well as automatic. For manual control, the switches 77 and 82 are operated from their A positions to their M positions. At the same time like changes are made in the positions of switches 83, 84, 85 and 86.

With the switches in the M positions, a three-position double-pole switch 87 directly controls the reversible motor 63. When it is moved to its lowermost position marked "close," the motor 63 is energized directly through field winding 66 for rotation in one direction to close valve 12. When switch 87 is moved to the intermediate or "stop" position, the motor 63 remains at standstill, and when the switch is moved to its uppermost or "open" position, motor 63 is energized directly through field winding 67 for rotation in the other direction to open the valve 12.

While the system is under manual control, the slide-wire 48a is adjusted by the motor 63 and the voltages $E_1$ and $E_5$ are applied to the control network forming a part of the input circuit of the amplifier 37. Thus, the reset capacitor 40 will acquire more or lose part of its charge in the same manner as though the system were under automatic operation. However, the rate resistor 36 is short-circuited by the switch 85. The switch 86 also short-circuits the input of the amplifier and the contactors 61 and 62 remain in their deenergized positions. Switch 86 also reduces the resistance of the charging circuit of the reset capacitor 40 so that the potential difference across it more rapidly approaches the voltage $E_5$ as modified by the voltage $E_1$.

By the aforesaid provisions, the system is conditioned for return of operation from manual to automatic without abrupt change in position of the valve 12 from the setting obtained by manual operation of the switch 87. More particularly, when the switches are moved back to their A positions, the input signal to the amplifier will be of a low order until the charge on the reset capacitor changes. Thus, advantage is taken of the provisions claimed in McIlhenny Patent No. 2,679,022.

Now that one form of the invention has been fully set forth, it will be understood that variations may be made within the spirit and scope of the claims. For example, in Fig. 4 there has been substituted an arrangement for obtaining the voltage $E_5$ from a network which is not dependent upon the operation of a motor associated with the drive of the valve. In Fig. 4, the load 90 generically represents heating resistors for a compartment, such as the one illustrated in Fig. 1. It may also be a valve, the position of which is changed by the magnitude of the current flowing through its operating winding. The amplifier 37 has output circuits controlling the operating coils of contactors 61 and 62 in the same manner as explained in connection with Fig. 1. These contactors, however, instead of controlling the energization of a motor, are used in a control circuit for a current-regulating device shown as a triode 91, with the potential of its input circuit varied by operation of the contactors. With contactor 61 energized and assuming contactor 62 was previously energized for charging of capacitor 92 through resistor 93, a potential-controlling capacitor 92 discharges through a resistor 94, making the grid less positive with respect to the cathode. This decreases the current flow through the tube 91 and the load 90. With the load 90 a valve, spring-biased to the closed position, the result will be a movement toward the valve-closing position. The flow of the current through resistor 42 develops across the conductors 41 and 50 the voltage $E_5$. Thus, this voltage changes with change in energization of the load 90. With the contactor 62 energized, the charging circuit of capacitor 92 is again completed by way of resistance 93. The rising potential from capacitor 92 makes the grid of the tube 91 more positive with respect to the cathode and increases the current flow therethrough. During normal operation, the current through the tube 91 varies from minimum to maximum in accordance with the deviation of the temperature from its control point and as modified by the control network associated with the input circuit of the amplifier 37.

For manual operation, in addition to switches 85 and 86, Fig. 1, operating to their M positions, the switches 96 and 97, Fig. 4, are moved to their M positions and a rheostat 95 is connected directly to control the flow of current through the load and the resistor 42. At the same time, the capacitor 92 has its potential modified to follow the voltage developed in the circuit including the rheostat 95 and to minimize a sudden change in the control voltage on the tube 91 upon return of the switches 96 and 97 to their A or automatic positions. The tube 91 may be of many suitable types, the characteristics of tube 5963 being satisfactory.

What is claimed is:

1. A system for developing a signal in accordance with the magnitude of a condition, with the rate of change of said magnitude and with the time integral of the deviation of said magnitude from a predetermined level, comprising an electrical network having a source of supply for producing a first signal in accordance with the deviation of said magnitude from said level, signal-amplifying means having signal input connections, resistance means included in said input connections, a circuit from said network extending across said resistance means for developing in said input connections a voltage varying in accordance with change in said first signal, a rate resistor connected in series in said input connections, a rate capacitor, means including connections between said rate resistor and said rate capacitor for applying to them a voltage varying with change in said first voltage signal for developing in said input connections a voltage varying in accordance with the rate of change of said magnitude, a resistor connected at one end intermediate the ends of said resistance means and at the opposite end to the opposite side of said input connections, a reset capacitor connected to said last-named input connection, a second network having a power source for applying a voltage to said input connections through a circuit including said reset capacitor, and means operable under the control of the output of said amplifier for varying the voltage from said second network for developing in said input connections a voltage varying in accordance with the magnitude, rate of change of magnitude, and time integral of deviation of said magnitude from said predetermined level.

2. In a control system for producing a condition-controlling effect to maintain the magnitude of a condition at a predetermined value, the combination of means for producing a control signal related to the magnitude of said condition, circuit means connected to said first-named means for providing from said control signal a source of a first signal proportional to said magnitude and a source of a second signal proportional to the rate of change of said magnitude, said first and second signal sources having a common point, means providing a source of a feedback signal responsive to the magnitude of said condition-controlling effect, an amplifier having input terminals and output terminals, a loop circuit connected to said input terminals including sequentially in series said first signal source, said second signal source and said feedback signal source, reset means including a capacitor connected in said loop circuit adjacent said feedback source and a resistor connected across said input terminals, one side of its circuit extending to one of said input terminals from said common point of said first and second signal sources and the other side of its circuit extending to the other of said input terminals, and means connected to said output terminals for varying said condition-controlling effect in accordance with the unbalance between said signals and the charge on said reset capacitor.

3. In a control system for producing a condition-controlling effect to maintain the magnitude of a condition at a predetermined value, the combination of means for producing a control signal related to the magnitude of said condition, resistance means to which said control signal is applied for developing a signal proportional to said magnitude, means including a resistor in series with said resistance means for producing a voltage varying with rate of change of said magnitude, an amplifier having input terminals and output terminals, a loop circuit connected to said input terminals including sequentially in series said resistance means and said rate resistor, a feedback resistor and a reset capacitor connected in series with said rate resistor and said resistance means, a reset resistor connected across said input terminals from a point intermediate the ends of said resistance means, and means operable under the control of the output from said output terminals for developing a voltage across said feedback resistor which produces a voltage balance across said input terminals, said connections intermediate the ends of said resistance means being effective to lower the voltage to which said reset capacitor may be charged.

4. A system for developing an output signal in accordance with the magnitude of a condition, with the rate of change of said magnitude and with the time integral of the deviation of said magnitude from a predetermined level, comprising signal-amplifying means having input terminals and output terminals, a loop circuit connected between said input terminals and including therein at least four circuit components, means including a first of said circuit components for producing in said loop circuit a first signal in accordance with said magnitude of said condition, said first circuit component comprising a voltage-dividing means, means including a second of said components for producing in said input circuit a second signal in accordance with the rate of change of said magnitude, a third of said circuit components comprising a capacitor, means including the fourth of said circuit components operable under the control of the output of said amplifier for applying a feedback signal to said input circuit, and a resistor connected from one of said input terminals to said voltage-dividing means for developing in series with said resistor in a second loop circuit extending between said input terminals a fractional part of said first signal, current flow through said resistor to and from said capacitor introducing into said output signal a component varying in accordance with said time integral of said deviation.

References Cited in the file of this patent
UNITED STATES PATENTS
2,668,264   Williams _____ Feb. 2, 1954